United States Patent [19]

Mitchell

[11] 4,209,765
[45] Jun. 24, 1980

[54] TIRE DEFLATION WARNING APPARATUS
[75] Inventor: William E. Mitchell, Coventry, England
[73] Assignee: Dunlop Limited, London, England
[21] Appl. No.: 870,463
[22] Filed: Jan. 18, 1978
[30] Foreign Application Priority Data
  Jan. 19, 1977 [GB] United Kingdom ............ 02076/77
[51] Int. Cl.² ............................................ B60C 23/04
[52] U.S. Cl. .................................... 340/58; 73/146.5; 200/61.25; 200/82 E
[58] Field of Search ............ 340/58; 200/61.22, 61.25, 200/82 D, 82 E; 73/146.3, 146.5
[56] References Cited
U.S. PATENT DOCUMENTS

| 2,334,443 | 11/1943 | Schubert | 200/61.25 |
| 3,098,500 | 7/1963 | Gruber | 200/82 E X |
| 3,366,758 | 1/1968 | Bentzen et al. | 200/82 E |
| 3,646,514 | 2/1972 | Mitchell et al. | 340/58 |
| 3,654,601 | 4/1972 | Munson et al. | 340/58 |
| 3,872,268 | 3/1975 | Hata | 200/61.22 |
| 3,978,448 | 8/1976 | Vago | 340/58 |
| 3,987,407 | 10/1976 | Bruner | 340/58 |
| 4,004,271 | 1/1977 | Haven et al. | 340/58 |
| 4,134,102 | 1/1979 | Stewart et al. | 200/61.25 X |

Primary Examiner—John W. Caldwell, Sr.
Assistant Examiner—Joseph E. Nowicki
Attorney, Agent, or Firm—Stevens, Davis, Miller & Mosher

[57] ABSTRACT

Tire deflation warning apparatus comprising a tubular housing having a sliding piston, a port in the housing for connection to the inflation chamber of the tire whereby the pressure of air in the tire at normal operating pressure can urge the piston to move relatively to the housing, biasing means associated with the piston in opposition to the air, and magnetic means operated by movement of the piston to actuate a warning switch.

6 Claims, 3 Drawing Figures

TIRE DEFLATION WARNING APPARATUS

This invention relates to tire deflation warning apparatus.

In a first aspect the invention relates to a tire deflation warning apparatus which comprises:

(a) a pressure-responsive device comprising a tubular housing, a piston mounted in the housing for sliding movement therein, the internal surface of the housin and the external surface of the piston being so shaped and dimensioned that there is defined between them a pressure-chamber, a port in the housing for operative connection to the inflation chamber of the tire whereby the pressure of air in the tire at normal operating pressure can urge the piston to move relatively to the housing, a conduit interconnecting said pressure chamber and said port, and biasing means associated with the piston to bias it with respect to the housing in a direction opposite to that in which said air pressure urges movement; and (b) magnetic means arranged for operation by movement of the piston in said opposite direction, said operation serving to actuate a warning switch.

When the pressure in the tire falls below a predetermined value the biasing means overcomes the pressure exerted by said air pressure in the chamber, thereby causing the piston to move in said opposite direction and to operate said magnetic means.

Normally the pressure responsive device is mounted on the wheel, said magnetic means is mounted on the wheel axle and the warning switch is mounted on the frame of the vehicle, and it is to such arrangements that the following description particularly relates. Accordingly, in a second aspect the invention relates to a pressure responsive device mounted on a vehicle wheel, said device comprising a tubular housing, a piston mounted in the housing for sliding movement therein, the internal surface of the housing and the external surface of the piston being so shaped and dimensioned that there is defined between them an annular pressure-chamber, a port in the housing for operative connection to the inflation chamber of the tire whereby the pressure of air in the tire at normal operating pressure urges the piston to move relatively to the housing, a conduit interconnecting said pressure chamber and said port, and biasing means associated with the piston to bias it with respect to the housing in a direction opposite to that in which said air pressure urges movement.

The internal surface of the housing and the external surface of the piston are both conveniently cylindrical. The biasing means is conveniently a spring and where the piston is hollow the spring can be mounted coaxially within it.

The annular pressure chamber between the housing and piston can be constituted, for example, by providing the external surface of the piston and the internal surface of the housing with radially-extending flanges, so that the external surface of the piston is in sliding contact with the edges of the flanges of the housing, and the internal surface of the housing is in sliding contact with the edges of the flanges of the piston. There is thus provided an annular chamber whose length (and consequently volume) depends upon the relative position of the piston in the housing.

Said magnet means serving to actuate the warning device is conveniently a push rod, for example one mounted for sliding movement in a bush. The piston is conveniently kept in continuous contact with said push rod by means of a keep magnet which, for example, can be mounted on the piston.

Since the push rod or other means for actuating the warning switch is normally carried by the vehicle axle which rotates when the vehicle is in motion, whereas the switch is normally carried by the frame, it is necessary to allow for the resulting relative angular movement. This is conveniently done by said magnetic means. For example, a magnet can be carried by the rod which, when brought into an operative position actuates a switch (for example a reed switch) carried by the frame.

Apparatus which is an embodiment of the invention is now described, by way of example, with reference to the accompanying drawings.

Figure 2:
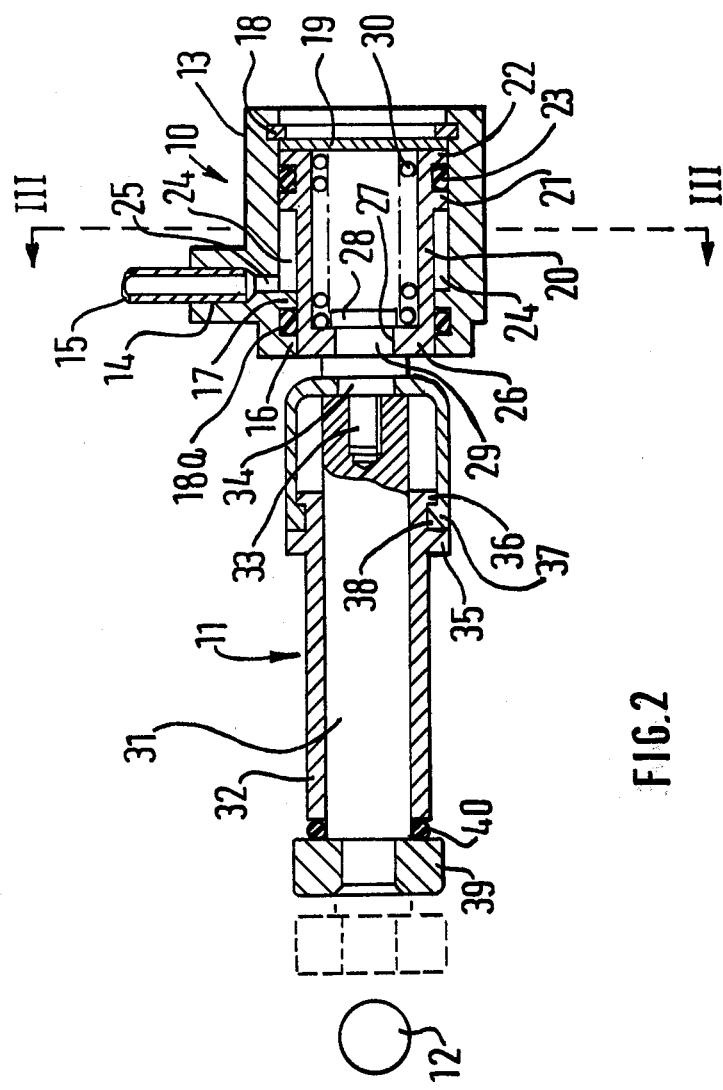
FIG. 2 is an elevation in section of the apparatus.
Figure 3:
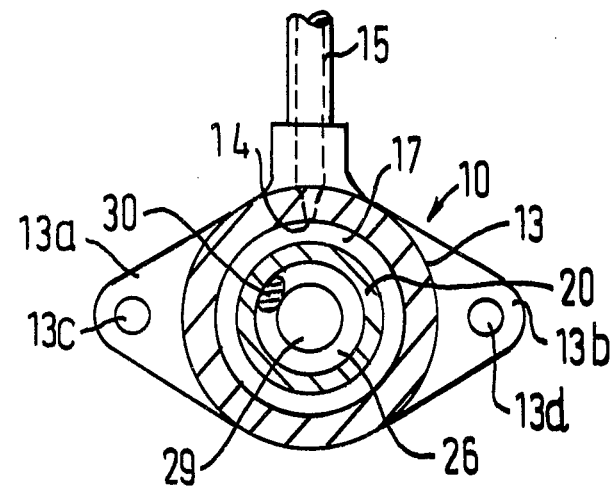
FIG. 3 is a cross-section of said apparatus on line III—III of FIG. 2.

Referring first to FIGS. 2 and 3, the apparatus comprises a pressure-responsive device 10 mounted on a vehicle wheel, a push rod assembly 11 mounted on the wheel axle, which serves as the means to actuate a warning reed switch 12 mounted on the frame of the vehicle.

The pressure-responsive device 10 comprises a cylindrical housing 13 having a port 14 which accommodates in an air-tight fit one end of a pipe 15 leading from the inflation chamber of the tire. In one end portion the internal surface of the housing has two spaced-apart annular flanges 16,17 of equal width between which is located an O-ring 18a. The other end portion of the housing has a circumferential groove which accommodates a resilient ring 18 which serves to act as a restraining means for circular disc 19 which is located radially in the housing and serves to close said other end of the housing.

A hollow cylindrical piston 20 of non-ferrous material e.g. light alloy or a plastic such as nylon is located inside the housing 13. In the end portion adjacent the disc 19 its external surface has two spaced-apart annular flanges 21,22 of equal width, between which is located an O-ring 23. The radial width of flanges 21,22 is the same as that of flanges 16,17 and the internal diameter of the housing and the external diameter of the piston are such that the internal surface of the housing is a sliding contact with the edges of flanges 21,22 and the external surface of the piston is in sliding contact with the edges of flanges 16,17, the O-rings 18a and 23 providing an air-tight seal between the piston and housing. Between the internal surface of the housing and the external surface of the piston is an annular pressure chamber 24 which communicates with port 14 by way of a conduit 25.

The end portion of the piston distant from the end portion adjacent disc 19 has an inwardly-directed annular flange 26 defining a circular aperture 27. In this aperture is located a cylindrical push-rod retaining magnet 28 whose purpose will be described below and whose shank 29 is an interference fit in the circular aperture 27.

Between the inner face of flange 26 and disc 19 there extends a compression spring 30 which acts to urge piston out of the housing, i.e. towards the left-hand side of the drawing. The cylindrical housing 13 is formed with integral lugs 13a, 13b having respectively apertures 13c, 13d, by means of which the housing can be attached to the vehicle wheel using screws or rivets.

The push rod assembly 11 comprises a cylindrical push rod 31 of a non-ferro-magnet material e.g. light alloy or a plastic such as nylon mounted for sliding movement in a bush 32 which is mounted on the wheel axle. In its end adjacent the pressure-responsive device and push rod has an internally located screw 33 having a head 34 in which there is a slot to receive the end of a screw driver for fitting. The screw is of a ferro-magnetic metal so that it can be strongly attracted by magnet 28.

The end of bush 32 nearer the screw has on its external surface two outwardly directed annular flanges 35,36 which define therebetween an annular groove. A cup-shaped rubber gaiter 37 having adjacent its lip an inwardly directed flange 38 and in its bottom a circular aperture serves to prevent the ingress of dirt which might interfere with the sliding of the rod in the bush. The flange on the lip of the gaiter is a push fit in the groove between the two annular flanges on the bush and holds the gaiter in place. The aperture in the bottom of the cup-shaped gaiter is of a size such that it embraces the screw head 34.

The end of rod distant from the screw carries a permanent magnet 39 which is attached to the rod, for example by use of adhesive or peening. The bush is of a length such that it does not extend to the end of the rod carrying the keep magnet, and in the annular gap between the end of the bush and the magnet 39 there is located an O-ring 40 mounted on the end of the rod to prevent ingress of dirt between the rod and the bush when the rod is in its normal inoperative position.

Figure 1:
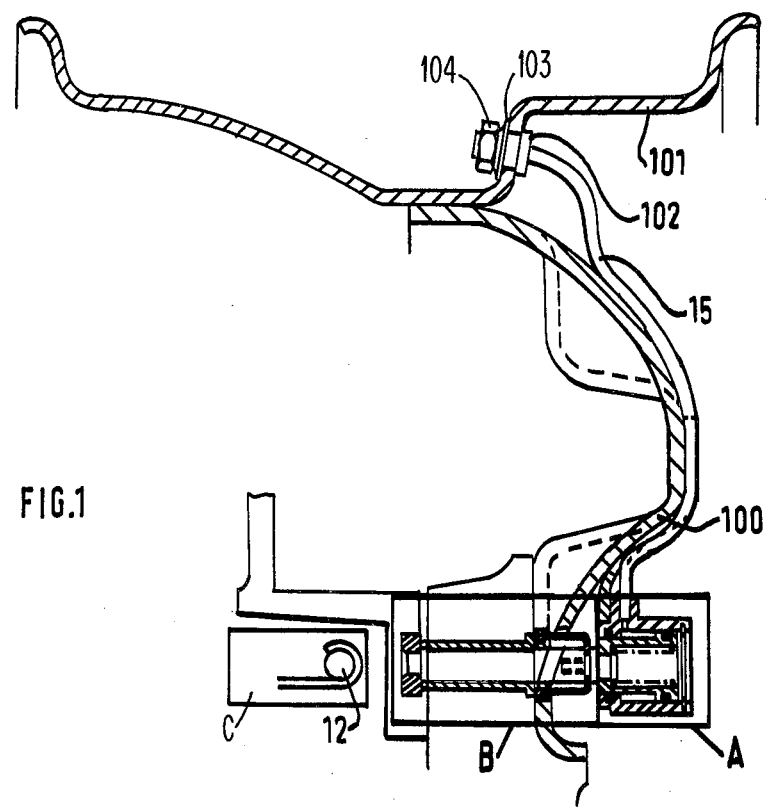
FIG. 1 is a diagrammatic elevation showing the apparatus fitted to a vehicle, the pressure-responsive device being mounted on a vehicle wheel and the magnetic means being mounted on the wheel axls.

In FIG. 1 which shows diagrammatic form the disposition of the warning device with respect to the vehicle, the pressure-responsive device and the magnetic means, which together comprise the warning apparatus, are indicated respectively by A and B,and C indicates the warning switch means mounted on the vehicle frame. Component structures A, B and C are surrounded by heavy lines clearly to indicate the members carried by the wheel, wheel axle and vehicle frame, respectively.

The pressure-responsive device A is mounted on the hub 100 of the wheel of the vehicle. The wheel rim 101 has an aperture in the well portion thereof which accommodates an end of pipe 15, that end being retained in said aperture by means of collar 102, air-tight washer 103 and retaining nut 104.

The reed switch 12 is mounted on the frame of the vehicle and is operatively connected to an indicator (not shown) in the driving compartment of the vehicle, for example a warning light on the dashboard.

Where each wheel of the vehicle is equipped with such apparatus, the driver can have warning of serious loss of pressure in any of the tires. The respective reed switches can be operatively connected to a single indicator, or two or more indicators can be used to indicate in which tire or which group of tires (for example on near side or off side) the loss of pressure has occurred.

The operation of the apparatus is as follows. When the air in the inflation chamber of the tire is at normal pressure that pressure is exerted via pipe 15 to the pressure chamber 24 and keeps the piston 20 in the position shown in FIG. 2, that is, it counteracts the force exerted by compression spring 30. However, when the air pressure falls to a predetermined value the force exerted by the spring on the piston is greater than that exerted by the air pressure in the chamber, and the piston moves leftwards with reference to FIG. 2, thereby carrying with it the rod 31 and its associated magnet 39. The magnet is thereby moved from the normal inoperative position (shown in full lines in FIG. 2) to an operative position (shown in dashed lines) in which it actuates the reed switch and thereby the indicator, giving warning to the driver of the vehicle of serious loss of pressur in the tire. The magnet 28 helps keep the housing in continuous contact with the push rod screw.

The apparatus of the invention has the considerable advantage that when a wheel has to be removed no troublesome disconnection of the apparatus is necessary. The pressure-responsive device 10 and the associated pipe 15, being mounted on the wheel, are removed in place with it, the push rod and reed switch remaining in place respectively on wheel axle and vehicle frame. Disconnection of the apparatus takes place simply by breaking the magnetic contact between magnet 28 (which remains in place in the piston 20) and the push rod screw head 34.

Having now described by invention what I claim is:

1. A tire deflation warning apparatus for use with a tire having an inflation chamber, said apparatus comprising:

a pressure-responsive device comprising:
 a tubular housing having an internal surface;
 a piston mounted in said housing for sliding movement therein, said piston having an external surface;
 a pressure chamber defined by and between said internal surface of said housing and said external surface of said piston;
 said housing having a port therein for operative connection to the inflation chamber of the tire whereby the pressure of air in the tire at normal operating pressure can urge the piston to move in a given direction and relative to the housing;
 a conduit for fluidly connecting said port to the inflation chamber;
 means for biasing the piston in a direction opposite to said given direction; and
magnetic means arranged for operation to actuate a warning switch by movement of said piston in said opposite direction, said magnetic means comprising a push rod adapted for attachment to a wheel axle of a vehicle, said push rod being coaxial with said piston and being axially movable in response to movement of said piston in said opposite direction one axial end of said push rod being closer to the housing than the other axial end thereof, and a permanent magnet carried by said other end of said push rod; and
 a keep magnet for holding said piston and said push rod together in contact for movement in unison.

2. Apparatus accoring to claim 1, in which said rod is located in a bush in which it is free to slide axially, said bush having first and second end portions and beind disposed with reference to said housing that it has said first end portion disposed nearer to said housing than said second end portion which is further from said housing; a flexible cup-shaped gaiter having a rim at its wider periphery extending around said first end portion of the bush to carry it, the rim of the gaiter being attached to said bush.

3. Apparatus according to claim 2, in which said permanent magnet is secured to said other end of the push rod, and a seal is carried by and adjacent said other end of said rod, said seal being effective to prevent ingress of dirt between said other end of said rod and said second end portion of said bush at least when the rod is in a retracted non-extended position corresponding to the position of the piston in which it is urged in said given direction.

4. Apparatus according to claim 1, in which said piston is hollow and said biasing means comprises a spring located inside the piston.

5. Apparatus according to claim 1, which includes a reed or other warning switch suitable for actuation by said magnetic means.

6. In combination, a vehicle wheel, a pneumatic tire defining an inflation chamber with said wheel, and a tire deflation warning apparatus, said apparatus comprising:
- a pressure-responsive device mounted on the vehicle wheel, said device comprising:
  - a tubular housing having an internal surface;
  - a piston mounted in said housing for sliding movement therein, said piston having an external surface;
  - a pressure chamber defined by and between said internal surface of said housing and said external surface of said piston;
  - said housing having a port therein for operative connection to the inflation chamber of the tire whereby the pressure of air in the tire at normal operating pressure can urge the piston to move in a given direction and relative to the housing;
  - a conduit fluidly connecting said port to the inflation chamber;
  - means for biasing the piston in a direction opposite to said given direction; and
- magnetic means arranged for operation to actuate a warning switch by movement of said piston in said opposite direction, said magnetic means comprising a push rod adapted for attachment to a wheel axle of a vehicle, said push rod being coaxial with said piston and being axially movable in response to movement of said piston in said opposite direction, one axial end of said push rod being closer to the housing than the other axial end thereof, and a permanent magnet carried by said other end of said push rod; and
- a keep magnet for holding said piston and said push rod together in contact for movement in unison.

* * * * *